(12) United States Patent
Arimilli et al.

(10) Patent No.: US 10,419,788 B2
(45) Date of Patent: Sep. 17, 2019

(54) CREATION OF VIRTUAL CAMERAS FOR VIEWING REAL-TIME EVENTS

(71) Applicants: Nathan Dhilan Arimilli, Austin, TX (US); Nevin Kumar Arimilli, Austin, TX (US); Shivani Kumar Arimilli, Austin, TX (US)

(72) Inventors: Nathan Dhilan Arimilli, Austin, TX (US); Nevin Kumar Arimilli, Austin, TX (US); Shivani Kumar Arimilli, Austin, TX (US)

( * ) Notice: Subject to any disclaimer, the term of this patent is extended or adjusted under 35 U.S.C. 154(b) by 54 days.

(21) Appl. No.: 14/871,392

(22) Filed: Sep. 30, 2015

(65) Prior Publication Data
US 2017/0094326 A1   Mar. 30, 2017

(51) Int. Cl.
*H04N 21/2343* (2011.01)
*H04N 21/239* (2011.01)
*H04N 21/218* (2011.01)
*H04N 21/472* (2011.01)
*H04N 21/8547* (2011.01)
*H04N 21/6587* (2011.01)
*H04N 21/81* (2011.01)

(52) U.S. Cl.
CPC . *H04N 21/23439* (2013.01); *H04N 21/21805* (2013.01); *H04N 21/2393* (2013.01); *H04N 21/47202* (2013.01); *H04N 21/6587* (2013.01); *H04N 21/816* (2013.01); *H04N 21/8547* (2013.01)

(58) Field of Classification Search
None
See application file for complete search history.

(56) References Cited

U.S. PATENT DOCUMENTS

| | | | |
|---|---|---|---|
| 5,600,368 A | | 2/1997 | Matthews, III |
| 5,729,471 A | * | 3/1998 | Jain .................... G06T 15/10 345/419 |
| 6,124,862 A | * | 9/2000 | Boyken .................. G06T 7/20 345/419 |
| 6,266,068 B1 | * | 7/2001 | Kang .................. G06T 11/60 345/422 |

(Continued)

OTHER PUBLICATIONS

Kanade et al., Immersive Telepresence, Virtualized Reality: Constructing Virtual Worlds from Real Scenes, pp. 34-46 IEEE (Year: 1997).*

(Continued)

*Primary Examiner* — Motilewa Good Johnson
(74) *Attorney, Agent, or Firm* — Brian F. Russell; Russell Ng PLLC (57) ABSTRACT

A video processing system receives a custom view request specifying a virtual camera perspective from which a dynamic scene in a physical environment is to be viewed. The video processing system generates a custom view of the scene from the virtual camera perspective, where generating the custom view includes generating the custom view based on both video content captured by one or more physical cameras and a dynamic three dimensional scene model of the scene residing within data storage. The video processing system records the custom view within on-demand video content and transmits the on-demand video content to a video presentation system.

27 Claims, 7 Drawing Sheets

(56) References Cited

U.S. PATENT DOCUMENTS

| | | | |
|---|---|---|---|
| 6,573,912 B1* | 6/2003 | Suzuki | G06T 17/10 |
| | | | 715/757 |
| 6,788,333 B1* | 9/2004 | Uyttendaele | H04N 5/23238 |
| | | | 348/36 |
| 7,312,766 B1* | 12/2007 | Edwards | G02B 27/017 |
| | | | 248/115 |
| 7,796,162 B2 | 9/2010 | Ortiz | |
| 7,823,058 B2* | 10/2010 | Pea | H04N 5/262 |
| | | | 345/620 |
| 8,665,374 B2 | 3/2014 | Katz et al. | |
| 9,266,017 B1* | 2/2016 | Parker | A63F 13/65 |
| 9,268,996 B1* | 2/2016 | Zimerman | G06K 9/00342 |
| 9,317,962 B2* | 4/2016 | Morato | G06T 15/06 |
| 9,682,321 B2* | 6/2017 | Iannetta | G09G 5/026 |
| 9,979,952 B2* | 5/2018 | Lee | G06T 7/11 |
| 2005/0001852 A1* | 1/2005 | Dengler | G06T 15/20 |
| | | | 345/633 |
| 2006/0082574 A1* | 4/2006 | Tsubaki | G09G 3/003 |
| | | | 345/419 |
| 2006/0244831 A1 | 11/2006 | Kraft et al. | |
| 2007/0005795 A1* | 1/2007 | Gonzalez | G06F 17/30017 |
| | | | 709/232 |
| 2007/0052858 A1* | 3/2007 | Zhou | G06K 9/00771 |
| | | | 348/584 |
| 2007/0058717 A1* | 3/2007 | Chosak | G06K 9/32 |
| | | | 375/240.08 |
| 2007/0279494 A1* | 12/2007 | Aman | G01S 3/7864 |
| | | | 348/169 |
| 2008/0178232 A1 | 7/2008 | Velusamy | |
| 2008/0246759 A1* | 10/2008 | Summers | G06F 3/0304 |
| | | | 345/420 |
| 2009/0216727 A1* | 8/2009 | Dozoretz | G06F 17/30035 |
| 2009/0315978 A1 | 12/2009 | Wurmlin et al. | |
| 2010/0020068 A1* | 1/2010 | House | G06T 15/20 |
| | | | 345/419 |
| 2010/0239122 A1* | 9/2010 | Busch | G06T 15/04 |
| | | | 382/103 |
| 2011/0261050 A1* | 10/2011 | Smolic | G06T 15/20 |
| | | | 345/419 |
| 2012/0087588 A1 | 4/2012 | Carter | |
| 2012/0188452 A1* | 7/2012 | Keiser | G06T 13/00 |
| | | | 348/559 |
| 2014/0013228 A1 | 1/2014 | Hutten | |
| 2014/0037213 A1 | 2/2014 | Niederberger et al. | |
| 2014/0101549 A1 | 4/2014 | Sheeley | |
| 2014/0340487 A1* | 11/2014 | Gilliland | G01S 7/4863 |
| | | | 348/48 |
| 2015/0297949 A1* | 10/2015 | Aman | G06T 7/246 |
| | | | 348/157 |
| 2015/0363965 A1* | 12/2015 | Wells | G06T 7/004 |
| | | | 345/419 |
| 2015/0363966 A1* | 12/2015 | Wells | G06F 3/017 |
| | | | 345/419 |
| 2015/0363967 A1* | 12/2015 | Wells | G06T 15/20 |
| | | | 345/419 |
| 2016/0180590 A1* | 6/2016 | Kamhi | G06T 7/0051 |
| | | | 345/633 |
| 2016/0269639 A1* | 9/2016 | Chang | H04N 5/23267 |
| 2017/0201779 A1* | 7/2017 | Publicover | H04N 21/252 |

OTHER PUBLICATIONS

Moezzi et al., Virtual View Generation for 3D Digital Video, pp. 18-26, IEEE (Year: 1997).*

* cited by examiner

CREATION OF VIRTUAL CAMERAS FOR VIEWING REAL-TIME EVENTS

BACKGROUND OF THE INVENTION

The present invention relates to the production and control of video content, and in particular, to the production and control of on-demand video content that utilizes modeling support to enable viewing of dynamic scenes from virtual camera perspectives.

In the prior art, video content is broadcast, for example, utilizing over-the-air terrestrial or satellite-based radio frequency signals, via cable and fiber optic network, or via data networks, such as the Internet. U.S. Pat. No. 5,600,368 to Matthews, III describes conventional video programming as follows:

> Although multiple cameras may have been used to cover the event, the program's producer selects which camera to use at which point in the program so that only one video stream is broadcast to the viewer. For example, when broadcasting sporting events, such as baseball games or tennis matches, the sports network typically employs multiple cameras to adequately cover the action. The multiple cameras enable ready replay of key plays, such as a runner sliding into home plate or a diving backhand volley, from many different angles. The producer relies on his or her creativity and experience to timely select the appropriate camera viewpoint which best conveys the sporting event.
>
> The viewer, on the other hand, has no control over what he/she is viewing. Conventional broadcast systems are not interactive and thus, the viewer is forced to watch the single video stream compiled by the program's producer. As a result, the viewer cannot independently choose to watch the action from the home plate camera in anticipation of a close call at home plate.

Matthews, III goes on to disclose an interactive system in which a television viewer can control which physical camera's video feed is presented on a primary broadcast channel.

U.S. Patent Application Publication No. 2014/0101549 to Sheeley further discloses that the views provided by a video production system are not limited to those obtained by physical cameras, but can instead include those provided by virtual cameras.

U.S. Patent Application Publication No. 2008/0178232 to Velusamy similarly discloses that virtual cameras' views are computed from frames of physical cameras:

> Specifically, by providing the user with the capability to control the views to be shown on a display screen using the VVCD 109, the user can not only experience a feeling of being within the scene, but will also appear to have the ability to control a "virtual camera," which can be placed and moved anywhere in the coverage area in three-dimensional space, thereby providing the user with a first person view of the event As the user "moves" through the scene, the VVP 105 ensures that the full screen action for the user, either by seamlessly providing parts of the area covered by a single camera, or by interpolating (or "stitching") frames to provide a smooth transition between cameras or by generating frames based on inputs from one or more cameras, in response to the user's actions to the view the event in a desired way.

U.S. Patent Application Publication No. 2006/0244831 to Kraft similarly discloses that the virtual cameras' views are computed through the application of mathematical transformations to the images provided by the physical cameras:

> Each positioned camera, of course, is normally equipped with a lens. While the preferred lens is a fisheye lens or other wide-angle lens, any other lens can be used. Mathematical transformations can be used to combine images from any or all cameras covering an event to produce virtual pan, tilt and zoom and to create virtual camera positions and view angles from many different virtual locations.

BRIEF SUMMARY

The present invention recognizes that conventional video production systems have been limited in the number of possible camera perspectives because the camera perspectives are limited to those directly obtained from physical cameras or mathematically derived from the video content provided by physical cameras. Views of portions of a scene for which the physical cameras provide no coverage are difficult, if not impossible, to accurately render.

In some embodiments, a video processing system receives a custom view request specifying a virtual camera perspective from which a dynamic scene in a physical environment is to be viewed. The video processing system generates a custom view of the scene from the virtual camera perspective, where generating the custom view includes generating the custom view based on both video content captured by one or more physical cameras and a dynamic three dimensional scene model of the scene residing within data storage. The video processing system records the custom view within on-demand video content and transmits the on-demand video content to a video presentation system.

DETAILED DESCRIPTION

Figure 1:
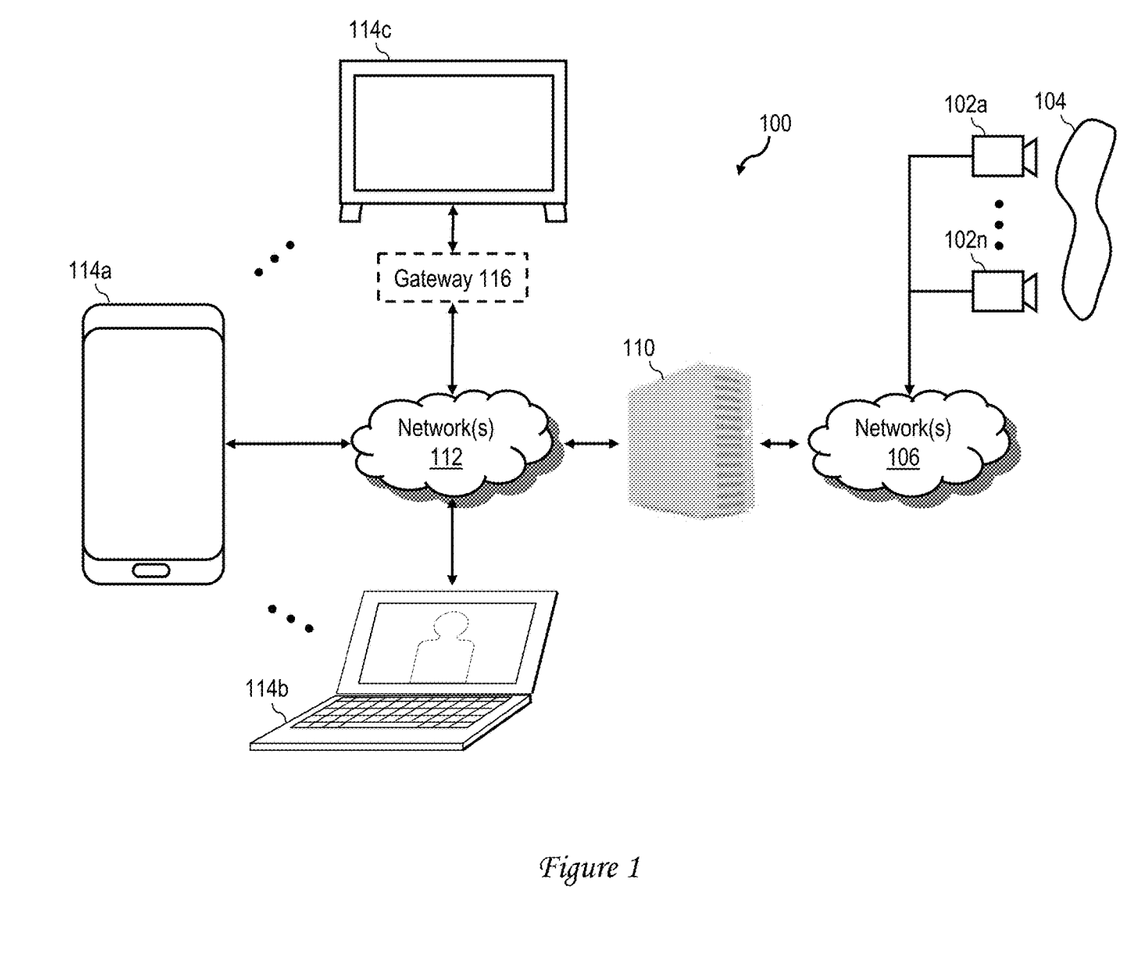
FIG. 1 is a high level block diagram of an data processing environment in accordance with one embodiment.

With reference now to the figures, and in particular with reference to FIG. 1, there is illustrated a data processing environment 100 in which the inventions disclosed herein may advantageously be utilized. Data processing environment 100 includes one or more (and preferably a plurality of) cameras 102a-102n that capture video (i.e., a time ordered sequence of digital images) of a scene 104. Although not required, in many environments 100, scene 104 includes both dynamic elements exhibiting a relatively high frequency and/or velocity of motion relative to other elements of scene 104 and static elements exhibiting a relatively low frequency and/or velocity of motion relative to other elements of scene 104. In various implementations, scene 104 may have a wide range of dimensional scales, ranging from microscopic to human scale to macro-scale.

As will be appreciated, the technology employed by camera(s) 102a-102n to capture video of scene 104 will vary according to the environment and/or dimensional scale of scene 104. For example, for scenes 104 of microscopic scale, camera(s) 102 may be implemented utilizing the imaging sensor of a scanning electron microscope or the optical sensor of a microscope. For human scale scenes 104, camera(s) 102 may be, for example, two-dimensional (2D) or three-dimensional (3D) video cameras that capture images in the visible and/or infrared spectrums or the sensor of a medical imaging device (e.g., magnetic resonance imaging (MRI), positron emission tomography (PET), etc.). For larger macro-scale scenes 104, camera(s) 102 may be, for example, satellite-based cameras or image sensors associated with optical or radio telescopes.

Camera(s) 102a-102n are communicatively coupled, either directly or indirectly through one or more communication networks 106 to video processing system 110, which, as described in greater detail below, may be utilized to the produce and/or distribute on-demand video content. Exemplary embodiments of video processing system 110 are described in greater detail below with reference to FIG. 2.

Video processing system 110 is further communicatively coupled, either directly or via one or more communication networks 112, to one or more video presentation systems 114, such as video presentation systems 114a-114c. In various realizations of data processing environment 100, communication network(s) 112, 106 may include, for example, a wireless wide-area network (WAN) including a plurality of distributed terrestrial, atmospheric and/or satellite-based antennae and associated electronics that support long range two-way radio frequency communication. Communication network(s) 112, 106 may alternatively or additionally include one or more circuit-switched and/or packet-switched communication networks, including, for example, the Internet.

As generally shown in FIG. 1, video presentation systems 114 may include any systems capable of receiving video content from video processing system 110 (possibly through one or more intermediate systems) and causing the video content to be visually presented (e.g., on a display device). In some embodiments, video presentation systems 114 may transmit to video processing system 110 custom view requests (e.g., in response to an input of a user viewing a video presentation at a video presentation system 114) specifying an arbitrary perspective from which to view scene 104. In response to such custom view requests, video processing system 110 may provide video from the custom view from the desired perspective on demand to individual video presentation systems 114. In the illustrated data processing environment 100, specific examples of video presentation systems 114 include a smartphone 114a, a computer system (e.g., desktop, laptop or tablet) 114b, and a video display device (e.g., television set) 114c. Other examples include digital video recorders, set top boxes, video projection systems, video game console, etc. As further shown in FIG. 1, in some cases, a video presentation system 114 is coupled to video processing system 110 via an associated data processing system, such as an intermediate gateway 116 or set top box.

Figure 2:
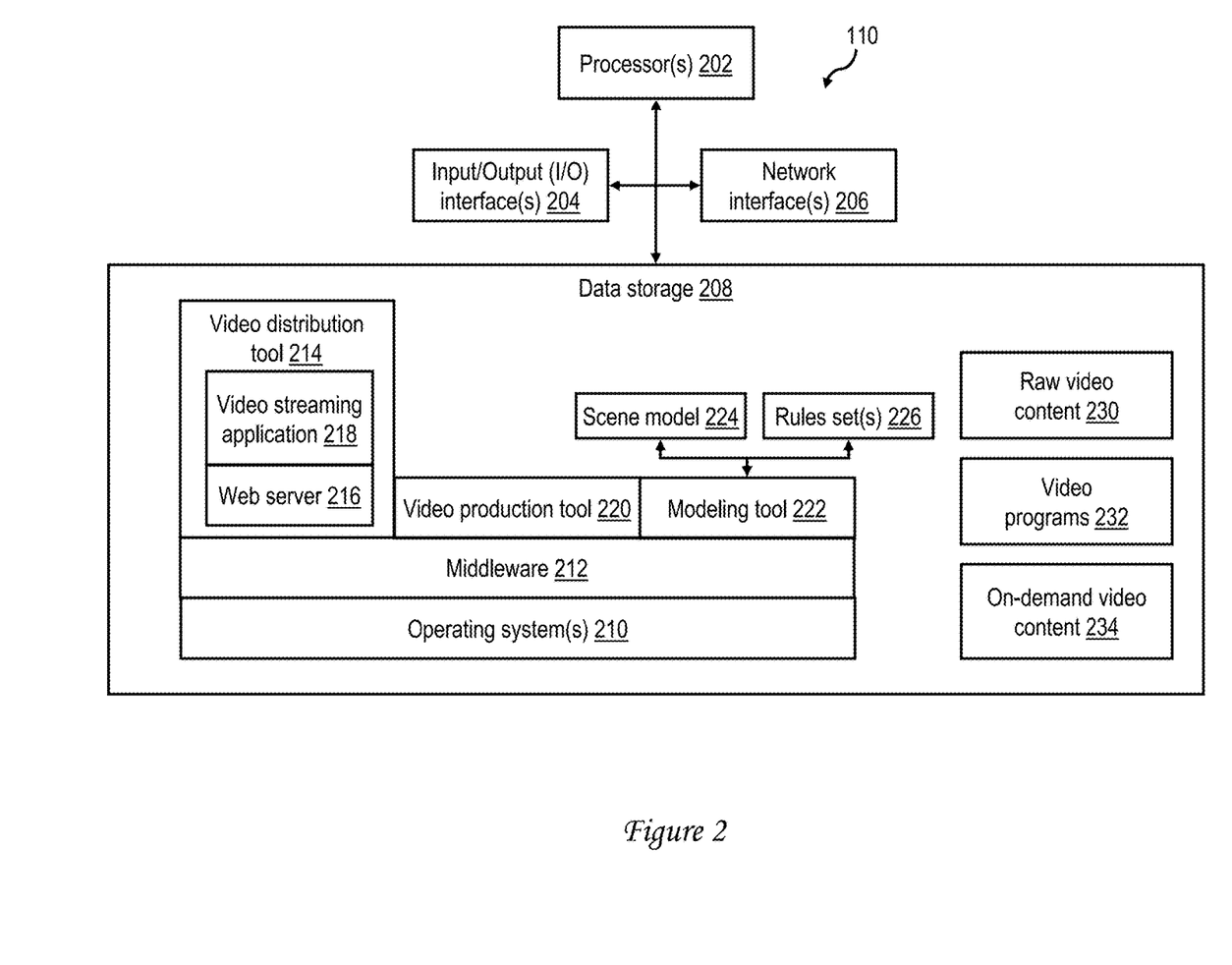
FIG. 2 is a block diagram of a video processing system in accordance with one embodiment.

Referring now to FIG. 2, there is depicted a high-level block diagram of an exemplary video processing system 110 in accordance with one embodiment. In the illustrated embodiment, video processing system 110, which may comprise one or more possibly distributed physical data processing platforms, includes one or more (and in some embodiments, a multiplicity of) physical processors 202, each of which may include one or more physical processor cores. Coupled to processor(s) 202 are one or more input/output (I/O) interfaces 204 through which video processing system 110 receives inputs and provides outputs. As one example, I/O interfaces 204 may include one or more input devices through which a producer may select video feeds of various ones of cameras 102a-102n for inclusion within a video program distributed to one or more video presentation systems 114. Video processing system 110 also includes one or more network interfaces 206 through which video processing system 110 communicates data (including video data) via networks 112 and/or 106. Video processing system 110 further includes data storage 208, which may include volatile and/or non-volatile storage devices, such as memories, optical or magnetic disks, etc., for storing data and program code (e.g., firmware and/or software) executable by processor(s) 202.

In the depicted embodiment, the program code stored within data storage 208 includes one or more operating systems 210, one or more instances of middleware 212, and one or more applications. In general, the operating system(s) 210 manage the physical and virtual resources of video processing system 110 and provide an operating environment and low level services for the middleware 212 and application software. Middleware 212 provides additional higher level services to the applications, such as intercommunication and input/output.

In the illustrated example, the applications that are stored within data storage 208 and are executable by processor(s) 202 include a video distribution tool 214, which may include, for example, a web server 216 that serves web pages of one or more web sites to video presentation systems 114 and a video streaming application 218 that streams video content to video presentation systems 114. As will be appreciated, in some implementations, video streaming application 218 may stream video content to video presentation systems 114 embedded within the web pages served by web server 216. In other implementations, video streaming application 218 may stream video content to video presentation systems 114 separately from such web pages. Video distribution tool 214 may alternatively or additionally broadcast video content via conventional cable, over-the-air or satellite broadcast channels.

In the illustrated example, the applications stored within data storage 208 further include a video production tool 220 that can be utilized to process raw video content 230 captured by cameras 102a-102n into produced video content, such as video programs 232, which can then be distributed by video distribution tool 214. Video distribution tool 220 can alternatively or additionally be utilized to automatically produce on-demand video content 234, for example, in response to custom view requests received from video presentation systems 114. It should be appreciated that in some embodiments, video distribution tool 214 generally directly streams raw video content 230 captured by one or more cameras 102 and unprocessed by video production tool 220 to video presentation systems 114 and inserts selected on-demand video content 234 produced by video production tool 230 into the video stream directed to a particular video presentation system 114, for example, in response to receipt of a custom view request from that particular video presentation system 114. In other embodiments, video distribution tool 214 generally streams a video program 232 (which may optionally be produced by video production tool 220) and inserts selected on-demand video content 234 produced by video production tool 230 into the video stream of a particular video presentation system 114, for example, in response to a custom view request by that particular video presentation system 114. The on-demand video content 234 distributed by video distribution tool 214 can be substantially real time video content or can be non-real time video content (e.g., video content reflecting past or speculative future views of scene 104).

In the illustrated example, the application programs stored within data storage 208 additionally include a modeling tool 222. In a preferred embodiment, modeling tool 222 generates from raw video content 230 a scene model 224, which is a substantially real time three dimensional (3D) model of scene 104. In some embodiments, scene model 224 has an associated collection of one or more rule sets 226 governing the permissible behavior (e.g., positions and movements) of elements of scene model 224. For example, rule set(s) 226 may include general rules specifying physical dimensions of static and dynamic elements of scene 104, physical laws of motion governing the movement of the dynamic elements, and biological constraints on ranges of motion of dynamic elements representing living entities. One or more of rule set(s) 226 may be predetermined and thus developed independently of any video content. Other rule set(s) 226 may be specific to a particular scene 104 and can be generated automatically by modeling tool 222, for example, through processing of raw video content 230 of the scene 104. For example, for the case where scene 104 is a sporting event, a first rule set may govern the motion of a ball within scene model 224 in accordance with known physical laws of motion, a second rule set may govern the motion of human participants in the sporting event represented in scene model 224 in accordance with known biological constraints (e.g., human knees and elbows are not intended to bend backwards), and a third rule set developed by modeling tool 222 by processing raw video content 230 may determine the physical dimensions of the human participants and static elements (e.g., the sporting venue) represented in scene model 224.

Figure 3:
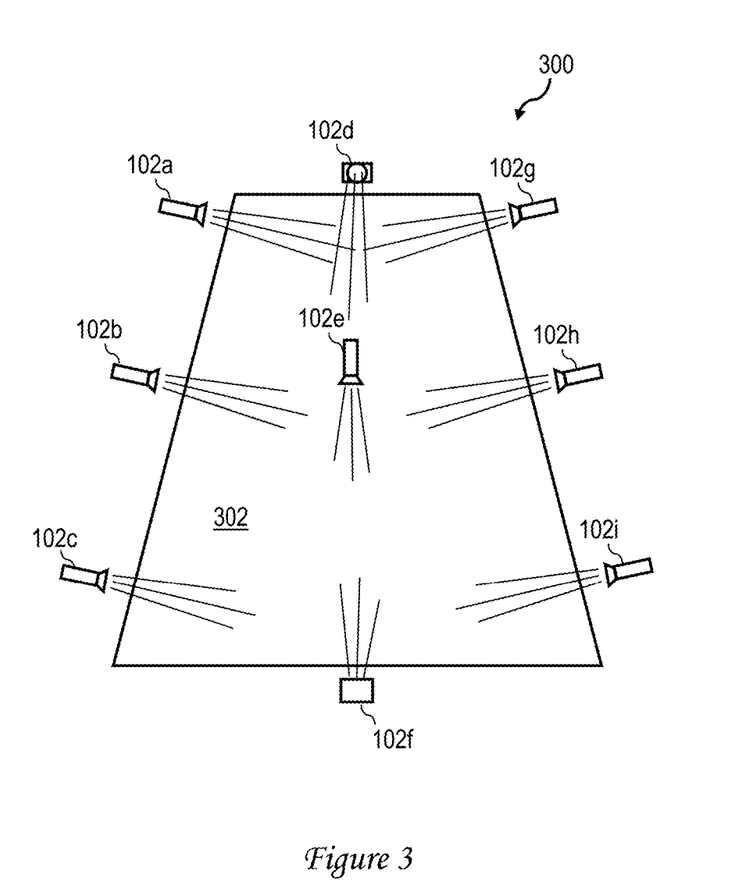
FIG. 3 illustrates an exemplary venue in which a scene may be captured on video in accordance with one embodiment.

With reference now to FIG. 3, there is illustrated an exemplary venue 300 in which a scene 104 may be captured on video in accordance with one embodiment. Exemplary venue 300 includes a physical surface 302, such as a sporting field, a stage, street, etc., providing a static element within scene 104. Video of scene 104 is captured by a plurality of cameras 102a-102i. As indicated, the coverage of cameras 102 can be enhanced by recording scene 104 from multiple different perspectives, which can be captured, for example, by positioning cameras 102 on opposite sides of the scene 104 and/or above scene 104 (as illustrated with camera 102e). Further, coverage of cameras 102 can be increased by providing one or more cameras 102 (e.g., camera 102e) with wide angle and/or fisheye lenses. As will be appreciated, one or more of cameras 102 may additionally be mobile, enabling the mobile camera(s) 102 to capture video from a plurality of different perspectives over time.

Even with the coverage of scene 104 provided by cameras 102, it can be the case that a visual presentation of a portion of the scene 104 that is of particular interest to at least one viewer stationed at a video presentation system 114 is not available among the video feeds provided by any of cameras 102. As noted above, in the prior art an attempt was made to address this deficiency by performing a mathematical transformation on the raw video data captured by physical cameras. However, one aspect of the inventions disclosed herein is the recognition that such mathematical transformation can only provide the desired visual presentation of the portion of the scene 104 if video of that portion of the scene 104 is completely captured by at least one camera. However, this may not be the case, for example, because one or more dynamic elements of the scene 104 obscure some or all of the portion of the scene 104 of which visual presentation is desired. As described below, the inventions described herein address this deficiency in part by generating a visual presentation of a desired portion of scene 104 based on not only on the video content captured by physical cameras 102 but also on the representation of the scene 104 provided by scene model 224.

Figure 4:
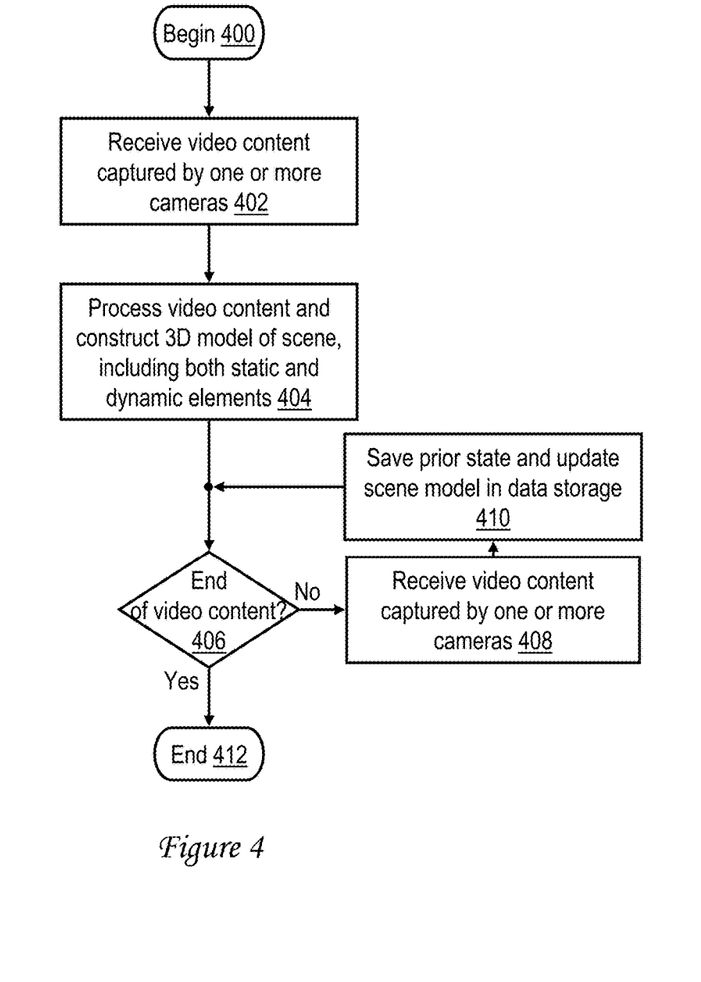
FIG. 4 is a high level logical flowchart of an exemplary process by which a video processing system generates a model of a scene from input video feeds in accordance with one embodiment.

Referring now to FIG. 4, there is depicted a high level logical flowchart of an exemplary process by which a data processing system generates a dynamic scene model 224 representing a scene 104 from one or more input video feeds in accordance with one embodiment. The illustrated process can be performed, for example, by a processor 202 through the execution of modeling tool 222. As with the other logical flowcharts provided herein, process steps are presented in logical rather than strictly chronological order, meaning that in some embodiments at least some steps can be performed in a different order than illustrated or concurrently.

The modeling process given in FIG. 4 begins at block 400 and then proceeds to block 402, which illustrates modeling tool 222 receiving, as input, video content featuring a scene 104 captured by one or more cameras 102. In some embodiments, block 402 represents modeling tool 222 receiving raw video content 230 in substantially real time (i.e., immediately after the raw video content 230 is recorded by cameras 102). In other embodiments, block 402 illustrates modeling tool 222 receiving produced video content, such as a video program 232 produced utilizing video production tool 220 or another video production tool.

The process proceeds from block 402 to block 404, which illustrates modeling tool 222 building a 3D scene model 224 of the scene 104, including both its static and dynamic elements, based at least in part on the input video content received at block 402. As will be appreciated, as the input video content is updated, modeling tool 222 continuously updates scene model 224 to reflect the most recently received video content. Thus, in implementations in which modeling tool 222 receives raw video content 230 in substantially real time, scene model 224 provides a substantially real time representation of the actual physical configuration of scene 104.

As will be appreciated by those skilled in the art, in various embodiments, scene model 224 may employ any of (or a combination of) multiple different modeling techniques to develop scene model 224. For example, these modeling techniques may include, for example, image-based modeling in which transformable 3D objects are algorithmically derived from two-dimensional images, such as those provided by conventional 2D video. The modeling techniques may additionally include 3D scanning in which physical objects within the scene 104 (static elements only or, in some embodiments, both static elements and dynamic elements) are scanned (e.g., with a laser), and the raw data (e.g., three dimensional point clouds) are used to generate an accurate polygonal or non-uniform rational basis spline (NURBS) mesh representing the surfaces present in scene 104. It should be noted that in many use cases, scene model 224 will initially be incomplete, as fewer than all surfaces of all elements are generally shown in any small subset of video content. However, as more video content is processed, scene model 224 will be rapidly built out.

At block 406, modeling tool 222 determines whether or not an end of the video content captured from the scene 104 has been reached (e.g., if a video program 232 has ended or if the capture of raw video content 230 from has ended). If so, the process of FIG. 4 ends at block 412. If, however, modeling tool 222 makes a negative determination at block 406, the process passes to block 408. Block 408 depicts modeling tool 222 receiving additional video content of the scene 104 captured by physical cameras 102. Given the presence of dynamic elements within the scene 104, it is likely that one or more dynamic elements within the scene 104 as captured in the video content received at block 408 have changed and thus differ from the current state of scene model 224. Consequently, at block 410, modeling tool 222 saves the prior state of scene model 224 and then updates scene model 224 to reflect the new state of scene 104 captured in the video content received at block 408, where the updating includes updating the positions and surfaces topographies of the dynamic elements.

In at least some embodiments, the update to scene model 224 at block 410 can be accelerated by the application of one or more rules in rule set(s) 226. As one example, if a dynamic element within the scene 104 such as a thrown or kicked ball is moving along a parabolic path, modeling tool 222 can mathematically compute an updated position of the dynamic element within scene model 224 by reference to a rule set 226 regarding laws of motion rather than by reference to the updated video content. Modeling tool 222 preferably automatically determines which, if any, elements represented within scene model 224 are subject to update by reference to rule set(s) 226, for example, by computing one or more tentative updated locations of an element or surface over time, testing the tentative updated location(s) against the actual locations captured in updated video content, and thereafter employing the rule set(s) 226 confirmed as applicable by the testing. Following block 410, the process of FIG. 4 returns to block 406 and following blocks, which have been described.

The scene model 224 built in accordance with the process of FIG. 4 is characterized by at least two features significant to the disclosed inventions. First, scene model 224 provides a chronologically ordered set of states that enables non-real-time states of the modeled scene 104 to be accessed (e.g., by video production tool 220). These non-real-time states include all states represented in video content already processed by modeling tool 222, and depending on the adequacy of rule sets 226, can additionally include at least some future states relative to the state represented by the video content most recently processed by modeling tool 222. Second, scene model 224 enables a virtual camera perspective of a selected state of the modeled scene 104 to be generated from any arbitrary virtual camera perspective, regardless of whether or not such a virtual camera perspective can be generated (directly or mathematically) from the perspective of a physical camera 102 at the selected time.

Figure 5:
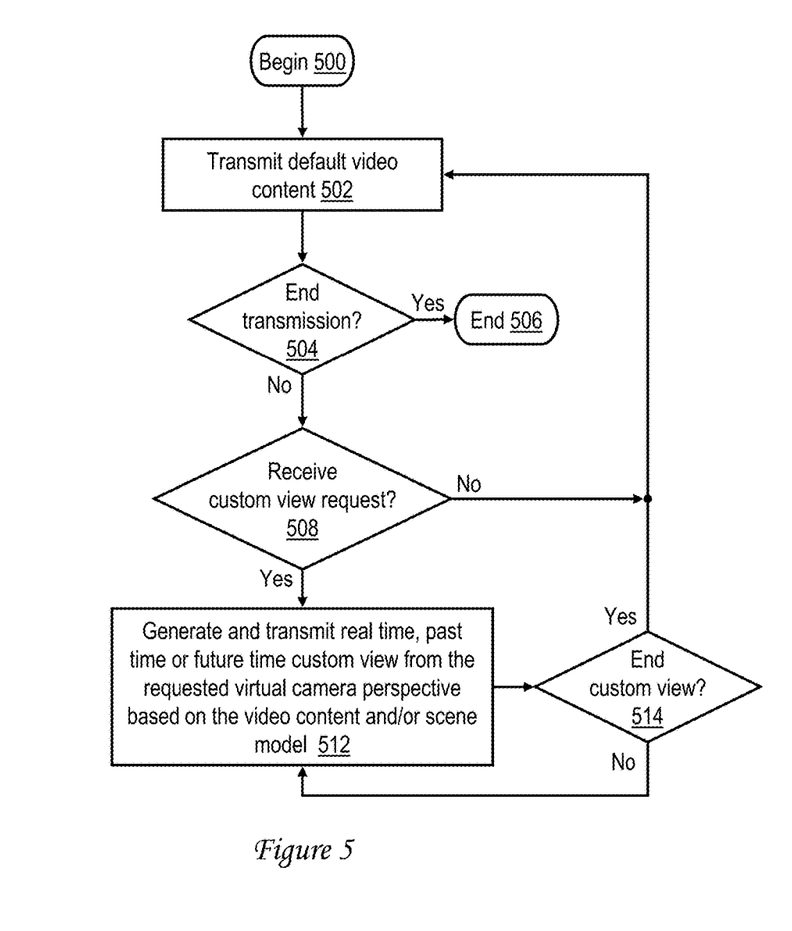
FIG. 5 is a high level logical flowchart of an exemplary process by which a video processing system produces and distributes video content in accordance with one embodiment.

With reference now to FIG. 5, there is illustrated a high level logical flowchart of an exemplary process by which a video processing system 110 produces and distributes video content to video presentation systems 114 in accordance with one embodiment. The illustrated process can be performed, for example, by a processor 202 of video processing system 110 through the execution of video distribution tool 214 and video production tool 220.

The process of FIG. 5 begins at block 500 and then proceeds to block 502, which illustrates video distribution tool 214 transmitting to one or more video presentation systems 114 default video content depicting a scene 104. As noted above, the default video content transmitted at block 502 can be program 232 can be raw video content 230 captured by one or more cameras 102 (which in some embodiments, can be selected by an end user through the end user's video presentation system 114). In other implementations, the default video content transmitted at block 502 can be produced video content, such as a video program 232, produced utilizing video production tool 220 or by another video processing system. In either case, the default video content, which can be prerecorded or can be a substantially real time presentation of scene 104, can be transmitted via network broadcast or on-demand to one or more video presentation systems 114.

At block 504, video distribution tool 214 determines whether or not to end transmission of video content, for example, due to the end of a video program 232 being reached or due to a termination of a network connection with a video presentation system 114. In response to a determination to end transmission of video content, the process of FIG. 5 ends at block 506. If on the other hand, video distribution tool 214 determines at block 504 not to end transmission of the video content, video distribution tool 214 further determines at block 508 whether or not a custom view request has been received from a video presentation system 114 (or a data processing system associated with a video presentation system 114). Those skilled in the art will appreciate that video presentation systems 114 (or their associated data processing systems) can employ a variety of different input devices and techniques to facilitate entry of custom view requests. These input devices and techniques can include, for example, keyboards, joysticks, touch screens, computer mice, track pads, haptic sensors, camera-based gestural interfaces, remote controls, etc. As one example, a custom view request can be a request to replay a video sequence from a different perspective from that previously shown in transmitted video content.

The custom view request, which can include, for example, one or more commands and/or messages, preferably identifies at least a virtual camera perspective from which a user desires to view scene 104. In at least one embodiment, the virtual camera perspective includes a selected position (e.g., x, y, z coordinate) around or within the scene 104 from which to view scene 104 and a direction of view. The perspective may optionally additionally specify pan, tilt, and/or a desired level of magnification (i.e., zoom) or reduction. The perspective may optionally additional specify a time, whether expressed as a relative time (e.g., relative to a beginning, end or current point in the presentation of the video content) or an absolute time (e.g., chronological time or elapsed time in the video content). It should be appreciated from the foregoing discussion that unlike prior art systems, the possible virtual camera perspectives from which scene 104 can be viewed is not limited by perspectives captured by physical cameras or mathematically derivable from the perspectives of the physical cameras. Instead, the selectable virtual camera perspectives include those possible at any position (e.g., x, y, z) and viewing direction within or surrounding scene 104. Further, the selectable perspectives are not limited to present time perspectives (e.g., freeze frame) or past time perspectives (e.g., replays), but as noted above can additionally include at least some future time perspectives, even in cases in which the video content is real time video content.

In response to a determination at block 508 that a custom view request has not been received, video distribution tool 214 continues to transmit the default video content, as represented by the process of FIG. 5 returning to block 502. However, in response to a determination at block 508 that video distribution tool 214 has received a custom view request, the process proceeds from block 508 to block 512.

Block 512 illustrates video processing system 110 generating and transmitting to one or more video presentation devices 114 a custom view of scene 104 from the requested virtual camera perspective based on the video content captured by cameras 102 and/or scene model 224. In at least some embodiments, video distribution tool 214 receives the custom view request and, responsive thereto, issues a corresponding custom view request to video production tool 220. In response to the custom view request, video production tool 220 produces on-demand video content 234 from the requested virtual camera perspective. In at least some embodiments, if the virtual camera perspective specified by the custom view request can be obtained from raw video content 230 or the video program 232, whether directly (e.g., from a video feed of a selected camera 102) or through mathematical transformation of the video content captured by a physical camera 102, video production tool 220 may produce the requested on-demand video content 234 from the raw video content 230 or the video program 232 without reference to scene model 224. However, in at least some cases in which the virtual camera perspective specified by the custom view request cannot be obtained from the raw video content 230 or the video program 232, video production tool 220 generates on-demand video content 234 of the scene 104 from the requested perspective based on both the video content captured by physical cameras 102 (e.g., raw video content 230 and/or the video program 232) and scene model 224. One exemplary process by which video production tool 220 builds frames of on-demand video content 234 is given in FIG. 6 and described below. After video production tool 220 begins producing on-demand video content 234, video distribution tool 214 can distribute the on-demand video content 234 to at least the requesting video presentation systems 114.

Following block 512, video distribution tool 214 determines at block 514 whether or not to end distribution of the custom view provided by the on-demand video content 234, for example, based on whether a request to resume presentation of the default video content has been received from the video presentation system 114 that made the initial custom view request. In response to a negative determination at block 514, the process returns to block 512, which has been described. In response, however, to an affirmative determination at block 514, video distribution tool 214 resumes distribution to the video presentation system 114 of the default video content at block 502.

Although FIG. 5 illustrates an embodiment in which video content featuring virtual camera perspectives is generated in response to a custom view request, it should be appreciated that in alternative embodiments, video production tool 220 can alternatively automatically generate a plurality of video clips from a variety of virtual camera perspectives in absence of (or in advance of) an explicit custom view request. In some embodiments, video distribution tool 214 can then provide thumbnails of the video clips, for example, via a web page served by web server 216 to one or more video presentation systems 114. In response to user selection of one of the thumbnails, video distribution tool 214 can then transmit the corresponding video clip to the appropriate video presentation system 114 as on-demand video content 234.

Figure 6:
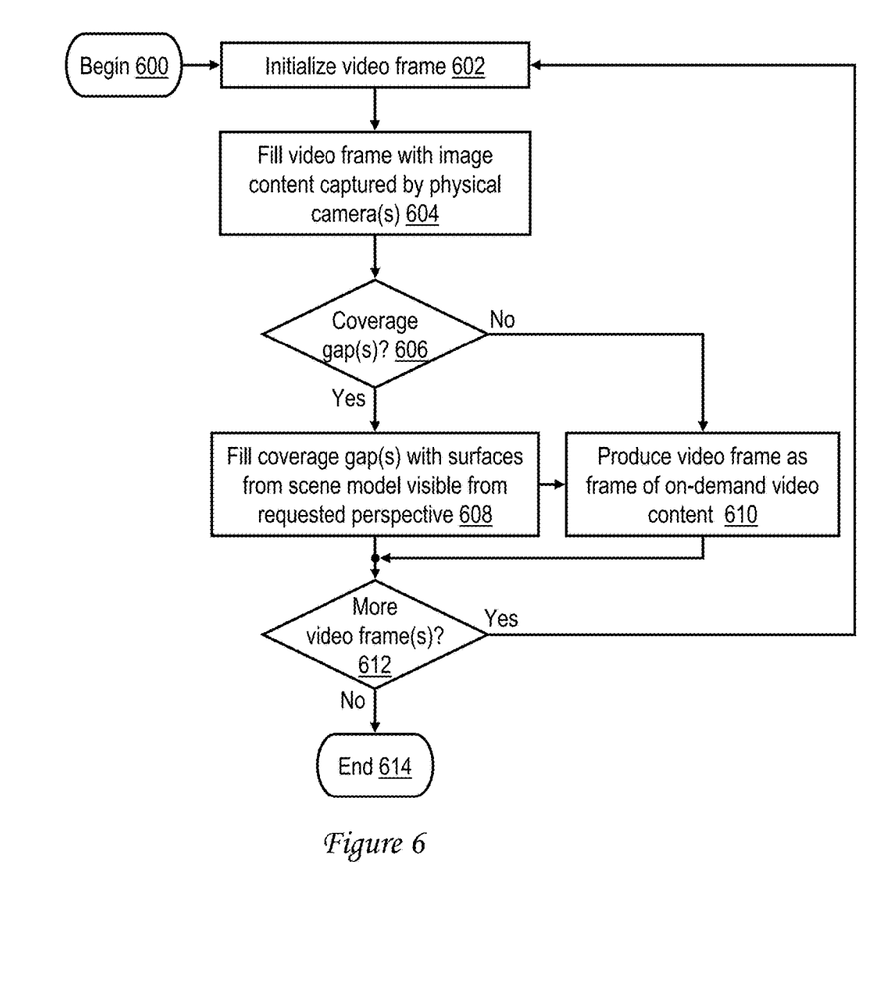
FIG. 6 is a high level logical flowchart of an exemplary process by which a video processing system generates a custom view of a scene from input video content captured by one or more physical cameras and/or a scene model in accordance with one embodiment.
Figure 7:
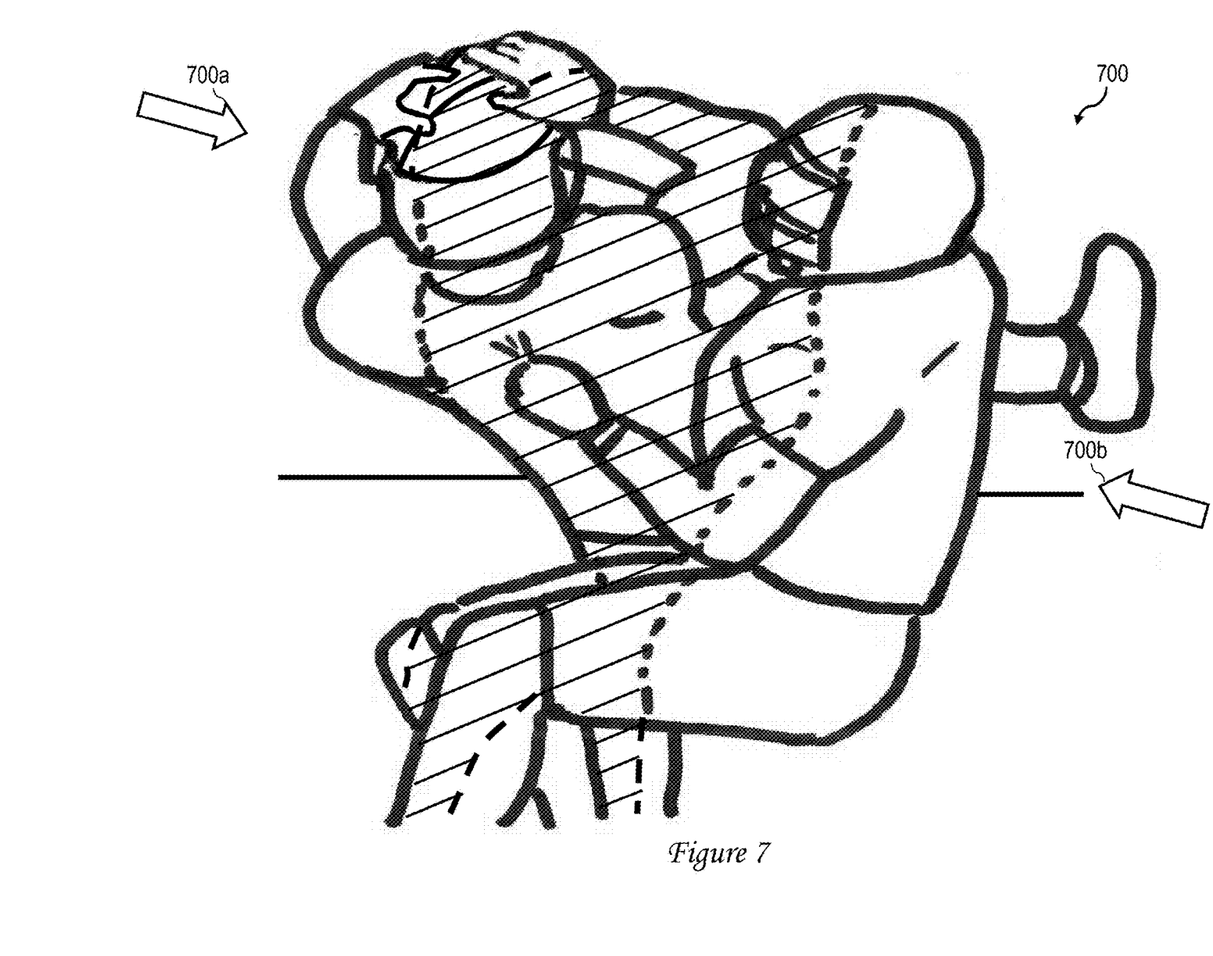
FIG. 7 illustrates an exemplary frame from a video presentation illustrating the merging of video content obtained from the video feed(s) of one or more physical cameras and model data provided by a model of a scene.

Referring now to FIG. 6, there is depicted a high level logical flowchart of an exemplary process by which a video processing system 110 generates a custom view of a scene from input video content captured by one or more physical cameras and/or a scene model in accordance with one embodiment. The illustrated process can be performed, for example, at block 512 of FIG. 5 by a processor 202 of video processing system 110 through the execution of video production tool 220. To promote understanding of the illustrated process, FIG. 6 is described with further reference to FIG. 7, which depicts an exemplary video frame 700 of on-demand video content 234.

The process of FIG. 6 begins at block 600 and then proceeds to block 602, which illustrates video production tool 220 initializing a video frame, for example, in a frame buffer. At block 604, video production tool 220 then begins to fill the video frame with image content (e.g., raw video content 230 and/or the video program 232) captured by physical cameras 102, after applying any mathematical transformation of the video content required to provide the virtual camera perspective requested by the custom view request. For example, in the example given to FIG. 7, video frame 700, which portrays a scene 104 of two American football players, includes video data (shown as unshaded) generated by video production tool 220 from video content captured by two physical cameras 102 whose perspectives are generally given by arrows 700a and 700b. As indicated by shading, the video data generated from the video content captured by physical cameras 102 does not cover all of video frame 700 from the depicted virtual camera perspective.

At block 606, video production tool 220 determines whether or not the current video frame 700 includes any coverage gaps, that is, whether there are areas of the video frame 700 that cannot be filled by video data supplied by or generated from video content captured by the two physical cameras 102 whose perspectives are represented by arrows 700a and 700b. In response to an affirmative determination at block 606, video production tool 220 accesses a desired state of scene model 224 (which may be specified by a relative or absolute time supplied by video distribution tool 214) and automatically fills the coverage gap(s) present in the current video frame with surfaces of the scene model 224 visible from the requested virtual camera perspective (block 608). These surfaces are depicted with shading in FIG. 7. In response to a negative determination at block 606 or following block 608, video production tool 220 produces the video frame, for example, by adding the video frame to a collection of on-demand video content 234 that is ready to be distributed (block 610).

At block 612, video production tool 220 determines whether one or more additional video frames of on-demand video content 234 are to be produced. In response to a determination at block 612 that one or more additional video frames of on-demand video content 234 are to be produced, the process of FIG. 6 returns to block 602 and following blocks, which have been described. If, however, video production tool 220 determines at block 612 that all video frames of a current segment of on-demand video content 234 have been produced, the process of FIG. 6 ends at block 614.

Although FIG. 6 illustrates an exemplary process in which video frames of on-demand video content are preferentially filled utilizing image content captured by physical cameras 102, it should be appreciated that in other embodiments video production tool 220 may instead preferentially fill video frames utilizing image data obtained from scene model 224. For example, in one implementation, video production tool 220 may test to determine a variance over time between surfaces predicted by scene model 224 and rules set(s) 226 and video content captured by physical cameras 102. For surfaces predicted by scene model 224 that have a greater than threshold conformance with (or less than threshold deviation from) those depicted in the video content captured by physical cameras 102, video production tool 220 may preferentially fill video frames with video data from scene model 224 and then fill any coverage gaps with video content captured by physical cameras 102, if available. Additionally, modeling tool 222 may utilize the results of the comparisons between the surfaces predicted by scene model 224 and those depicted in the video content captured by cameras 102 to update or modify scene model 224 and/or rule set(s) 226.

As has been described, in some embodiments, a video processing system receives a custom view request specifying a virtual camera perspective from which a dynamic scene in a physical environment is to be viewed. The video processing system generates a custom view of the scene from the virtual camera perspective, where generating the custom view includes generating the custom view based on both video content captured by one or more physical cameras and a dynamic three dimensional scene model of the scene residing within data storage. The video processing system records the custom view within on-demand video content and transmits the on-demand video content to a video presentation system.

While various inventions have been particularly shown as described with reference to one or more preferred embodiments, it will be understood by those skilled in the art that various changes in form and detail may be made therein without departing from the spirit and scope of the invention. The inventions disclosed herein may be realized as a system, a method, and/or a program product. A program product may include a data storage device having program code stored thereon for causing a processor of a data processing system to carry out aspects of the inventions. The data storage device may be, for example, an electronic storage device, a magnetic storage device, an optical storage device, an electromagnetic storage device, a semiconductor storage device, or any suitable combination of the foregoing. Specific examples of the data storage device include a portable computer diskette, hard disk, random access memory (RAM), static random access memory (SRAM), read-only memory (ROM), an erasable programmable memory (EPROM or Flash memory), compact disc (CD), digital versatile disk (DVD), and a memory stick. A data storage device, as used herein, is not to be construed as being nonstatutory subject matter (e.g., a transitory signal per se), such as a radio wave or other freely propagating electromagnetic wave, electromagnetic wave propagating through a waveguide or other transmission media (e.g., a light pulse passing through a fiber optic cable) or an electrical signal transmitted through a wire.

What is claimed is:

1. A method of video processing in a video processing system, the method comprising:
   the video processing system maintaining, within data storage, a dynamic three dimensional scene model of a dynamic scene in a real world physical environment, wherein the dynamic three dimensional scene model includes a plurality of dynamic elements individually corresponding to dynamic physical components of the dynamic scene in the physical environment, and wherein the maintaining includes the video processing system applying a rule set to at least a particular dynamic element of the plurality of dynamic elements to determine its dynamically changing position and movement within the scene model;
   the video processing system receiving first video content of the dynamic scene captured by one or more physical cameras;
   in response to the video processing system receiving a custom view request specifying a virtual camera perspective from which the dynamic scene is to be viewed, the video processing system automatically generating a custom view of the dynamic scene from the virtual camera perspective, wherein the automatically generating includes generating each of a plurality of video frames from the virtual camera perspective by:
      initializing a video frame among the plurality of video frames;
      filling the at least one coverage gap with second video content from the virtual camera perspective generated from the dynamic three dimensional scene model of the dynamic scene residing within data storage, wherein the second video content includes a surface of the particular dynamic element for which no video content captured by physical cameras is available that shows the surface of the particular dynamic element at its current position, wherein the filling includes rendering the surface based on application of the at least one rule set to the particular dynamic element;
   the video processing system recording the custom view within on-demand video content; and
   the video processing system transmitting the on-demand video content to a video presentation system.

2. The method of claim 1, wherein generating the custom view includes generating the custom view in substantially real time.

3. The method of claim 1, and further comprising building the three dimensional scene model within the data storage by processing video content captured by the one or more physical cameras.

4. The method of claim 1, wherein the transmitting the on-demand video content comprises transmitting the on-demand video content interspersed within a transmission of a video program depicting the scene.

5. The method of claim 1, wherein:
   the three dimensional scene model comprises a plurality of different states each corresponding to a respective one of a plurality of different chronological times;
   the custom view request further includes a timing indication; and
   the video processing system generates the custom view based upon a particular one of the plurality of different states of the three dimensional scene model corresponding to the timing indication.

6. The method of claim 1, wherein generating each of a plurality of video frames from the virtual camera perspective further includes:
   preferentially filling the video frame with the first video content captured by the one or more physical cameras except for the at least one coverage gap.

7. The method of claim 6, wherein preferentially filling the video frame with the first video content comprises preferentially filling the video frame with the first video content without use of the dynamic three dimensional scene model.

8. The method of claim 6, wherein preferentially filling the video frame with the first video content comprises filling the video frame with the first video content after applying a mathematical transformation to the first video content to provide the virtual camera perspective requested by the custom view request.

9. The method of claim 1, wherein generating each of a plurality of video frames from the virtual camera perspective further includes
preferentially filling the video frame with second video content from the virtual camera perspective generated from the dynamic three dimensional scene model rather than the first video content.

10. The method of claim 9, wherein:
the method further comprises testing to determine a variance over time between surfaces predicted by the dynamic three dimensional scene model and the first video content captured by the physical cameras; and
the preferentially filling includes preferentially filling the video frame to represent those surfaces predicted by dynamic three dimensional scene model that have a greater than threshold conformance with (or less than threshold deviation from) those depicted in the first video content.

11. The method of claim 1, wherein the at least one rule set includes at least one of a set consisting of (1) rules specifying physical dimensions of dynamic elements the dynamic scene, (2) physical laws of motion governing movement of the dynamic elements, and (3) biological constraints on ranges of motion of dynamic elements representing living entities.

12. A program product for video processing, the program product comprising:
a data storage device; and
program code stored within the data storage device, wherein the program code, when executed by a processor of a video processing system, causes the video processing system to perform:
the video processing system maintaining, within data storage, a dynamic three dimensional scene model of a dynamic scene in a real world physical environment, wherein the dynamic three dimensional scene model includes a plurality of dynamic elements individually corresponding to dynamic physical components of the dynamic scene in the physical environment, and wherein the maintaining includes the video processing system applying a rule set to at least a particular dynamic element of the plurality of dynamic elements to determine its dynamically changing position and movement within the scene model;
the video processing system receiving first video content of the dynamic scene captured by one or more physical cameras;
in response to the video processing system receiving a custom view request specifying a virtual camera perspective from which the dynamic scene is to be viewed, the video processing system automatically generating a custom view of the dynamic scene from the virtual camera perspective, wherein the automatically generating includes generating each of a plurality of video frames from the virtual camera perspective by:
initializing a video frame among the plurality of video frames;
filling at least one coverage gap for which no video content captured by physical cameras is available with second video content from the virtual camera perspective generated from the dynamic three dimensional scene model of the dynamic scene residing within data storage, wherein the second video content includes a surface of the particular dynamic element for which no video content captured by physical cameras is available that shows the surface of the particular dynamic element at its current position, wherein the filling includes rendering the surface based on application of the at least one rule set to the particular dynamic element;
the video processing system recording the custom view within on-demand video content; and
the video processing system transmitting the on-demand video content to a video presentation system.

13. The program product of claim 12, wherein generating the custom view includes generating the custom view in substantially real time.

14. The program product of claim 12, wherein the program code, when executed, further causes the video processing system to perform building the three dimensional scene model within the data storage by processing video content captured by the one or more physical cameras.

15. The program product of claim 12, wherein the transmitting the on-demand video content comprises transmitting the on-demand video content interspersed within a transmission of a video program depicting the scene.

16. The program product of claim 12, wherein:
the three dimensional scene model comprises a plurality of different states each corresponding to a respective one of a plurality of different chronological times;
the custom view request further includes a timing indication; and
the program code, when executed, further causes the video processing system to generate the custom view based upon a particular one of the plurality of different states of the three dimensional scene model corresponding to the timing indication.

17. The program product of claim 12, wherein generating each of a plurality of video frames from the virtual camera perspective further includes:
preferentially filling the video frame with the first video content captured by the one or more physical cameras except for the at least one coverage gap.

18. The program product of claim 17, wherein preferentially filling the video frame with the first video content comprises preferentially filling the video frame with the first video content without use of the dynamic three dimensional scene model.

19. The program product of claim 17, wherein preferentially filling the video frame with the first video content comprises filling the video frame with the first video content after applying a mathematical transformation to the first video content to provide the virtual camera perspective requested by the custom view request.

20. A video processing system, the video processing system comprising:
a processor;
data storage communicatively coupled to the processor; and
program code stored within the data storage, wherein the program code, when executed by the processor, causes the video processing system to perform:
the video processing system maintaining, within data storage, a dynamic three dimensional scene model of a dynamic scene in a real world physical environment, wherein the dynamic three dimensional scene model includes a plurality of dynamic elements individually corresponding to dynamic physical components of the dynamic scene in the physical environment, and wherein the maintaining includes the video processing system applying a rule set to at least a particular dynamic element of the plurality of dynamic elements to determine its dynamically changing position and movement within the scene model;

the video processing system receiving first video content of the dynamic scene captured by one or more physical cameras;

in response to the video processing system receiving a custom view request specifying a virtual camera perspective from which the dynamic scene is to be viewed, the video processing system automatically generating a custom view of the dynamic scene from the virtual camera perspective, wherein the automatically generating includes generating each of a plurality of video frames from the virtual camera perspective by:

initializing a video frame among the plurality of video frames;

filling the at least one coverage gap with second video content from the virtual camera perspective generated from the dynamic three dimensional scene model of the dynamic scene residing within data storage, wherein the second video content includes a surface of the particular dynamic element for which no video content captured by physical cameras is available that shows the surface of the particular dynamic element at its current position, wherein the filling includes rendering the surface based on application of the at least one rule set to the particular dynamic element;

the video processing system recording the custom view within on-demand video content; and the video processing system transmitting the on-demand video content to a video presentation system.

21. The video processing system of claim 20, wherein generating the custom view includes generating the custom view in substantially real time.

22. The video processing system of claim 20, wherein the program code, when executed, further causes the video processing system to perform building the three dimensional scene model within the data storage by processing video content captured by the one or more physical cameras.

23. The video processing system of claim 20, wherein the transmitting the on-demand video content comprises transmitting the on-demand video content interspersed within a transmission of a video program depicting the scene.

24. The video processing system of claim 20, wherein:
the three dimensional scene model comprises a plurality of different states each corresponding to a respective one of a plurality of different chronological times;
the custom view request further includes a timing indication; and
the program code, when executed, further causes the video processing system to generate the custom view based upon a particular one of the plurality of different states of the three dimensional scene model corresponding to the timing indication.

25. The video processing system of claim 20, wherein generating each of a plurality of video frames from the virtual camera perspective further includes:
preferentially filling the video frame with the first video content captured by the one or more physical cameras except for the at least one coverage gap.

26. The video processing system of claim 25, wherein preferentially filling the video frame with the first video content comprises preferentially filling the video frame with the first video content without use of the dynamic three dimensional scene model.

27. The video processing system of claim 25, wherein preferentially filling the video frame with the first video content comprises filling the video frame with the first video content after applying a mathematical transformation to the first video content to provide the virtual camera perspective requested by the custom view request.

* * * * *